United States Patent [19] [11] 4,142,738
Steinbach [45] Mar. 6, 1979

[54] BASE SHEETS FOR PRINTING WITH REACTIVE DYES

[75] Inventor: Wilfried Steinbach, Bergisch-Gladbach, Fed. Rep. of Germany

[73] Assignee: C. F. Wachendorff GmbH, Kradepohlsmuhle, Fed. Rep. of Germany

[21] Appl. No.: 764,800

[22] Filed: Feb. 2, 1977

Related U.S. Application Data

[63] Continuation of Ser. No. 533,531, Dec. 17, 1974, abandoned.

[30] Foreign Application Priority Data

Dec. 19, 1973 [CH] Switzerland ....................... 17797/73

[51] Int. Cl.[2] ........................... B41C 1/06; B32B 7/00

[52] U.S. Cl. .................................... 282/27.5; 428/212; 428/341; 428/342; 428/411; 428/325; 428/452; 428/454; 428/463; 428/471; 428/514; 428/537; 427/150; 427/151

[58] Field of Search ............... 428/325, 404, 452, 341, 428/342, 411, 454, 537, 514, 463, 471, 212; 282/27.5; 427/150, 151

[56] References Cited

U.S. PATENT DOCUMENTS

| | | | |
|---|---|---|---|
| 1,863,731 | 6/1932 | Schroger | 428/452 |
| 2,778,301 | 1/1957 | Brinnick | 101/149.2 |
| 2,934,467 | 4/1960 | Bergstein | 428/452 |
| 3,048,501 | 8/1962 | Miller | 428/452 |
| 3,081,198 | 3/1963 | Miller | 428/452 |
| 3,573,236 | 3/1971 | Barlow | 428/452 |
| 3,753,761 | 8/1973 | Sugahara | 428/452 |
| 3,927,237 | 12/1975 | Sund | 428/325 |

*Primary Examiner*—Ellis Robinson
*Attorney, Agent, or Firm*—Sprung, Felfe, Horn, Lynch & Kramer

[57] ABSTRACT

A base sheet for printing with reactive dyes is provided which has applied on at least one of its surfaces a reactive pigment coating which contains as pigment a mixture of a highly absorbent pigment and a sparingly absorbent pigment and which contains as binder an intimate mixture of a binder which is readily soluble in alcohols with a binder which is resistant to solvents. The base sheet is used as receptive sheet especially in transfer printing processes and permits technically improved operation with reactive dyes.

10 Claims, No Drawings

BASE SHEETS FOR PRINTING WITH REACTIVE DYES

This is a continuation, of application Ser. No. 533,531, filed Dec. 17, 1974 now abandoned.

This invention relates to the field of base sheets which are provided on at least one surface with a reactive pigment coating which permits printing with what is known as reactive dyes. The invention relates more particularly to a newly developed weakly basic to acidic reactive pigment coating of the kind mentioned which permits the use of the base sheet coated therewith in copying processes which operate with a graphic ink or dye based on what is known as basic reactive dyes.

Reactive dyes of this type are widely used to-day. In general, they are basic alcohol-soluble lactone dyes which, in the form obtained, are colorless and are converted into a visible form only by reaction with acids. Thus, it is known to provide the surface of a receptive paper sheet with a pigment coating having a weakly basic to acidic pH. If the reactive dye is then applied manually or mechanically to the surface of the receptor sheet having been treated in this manner, the lettering or image having been transferred is converted into a visible form by reaction with the pigment coating.

It is an object of the invention to provide a receptive sheet which is provided with a reactive pigment coating and which permits technically improved operation with reactive dyes of this kind of copying methods, especially in hectographing, transfer and manifold printing methods.

Hectographing is one of the oldest copying methods. An image receptive sheet is coated on the back with the dye in mirror writing and thereby becomes the printing sheet. After moistening with a solvent, especially with an alcoholic liquid, the superficially dissolved dye is transferred to the copying paper, i.e. the image receptor sheet. The number of copies which can be made is, of course, restricted due to the gradual removal of dye. Attempts are made by transferring the printing dye as sparingly as possible to keep the number of copies as high as possible. In practice, the surface to be printed of the receptive sheet is moistened to this end with a solvent whereafter the dye-carrying sheet with its dye-coated side is contacted with the receptor sheet. In this case, a small amount of the alcohol-soluble reactive dye is detached and absorbed in the reactive pigment coating of the receptor sheet. The reactive dye reacts on the receptor sheet with the special coating and becomes immediately visible.

The properties and the condition of the reactive pigment coating are critical for the applicability of the method in practice. This reactive pigment must at the same time comply with a plurality of requirements. It should especially have an absorptive power which is conformed to the particular use with sufficient resistance to solvents. The correct pH range, e.g., the neutral to slightly acidic reaction is necessary for developing the color. Colored coatings should also be resistant to alcohols and, moreover, have sufficient thermal resistance. The coating itself must be sufficiently smoothed to furnish a satisfactory printed image. The invention provides a solution to this problem which permits optimum use of such base sheets especially in the field of transfer printing processes.

According to the invention there is provided a base sheet, especially paper, paper board or carton, for printing with reactive dyes, especially with alcoholic solutions of such dyes, said base sheet having on at least one of its surfaces a reactive pigment coating and being characterized in that the binder of the reactive pigment coating is an intimate mixture of readily alcohol-soluble and solvent-resistant synthetic binders. It is preferred to use not only a mixture of two different binders but also a mixture of different pigments. In the preferred embodiment of the invention, the reactive pigment coating contains a mixture of highly absorptive and sparingly absorptive pigments. For operation with basic reactive dyes, the pH of the reactive pigment coating is in the acidic to weakly basic region. The preferred pH of the pigment coating or of the dispersion used for applying the coating is in the range of about 5 to 8 and preferably of 6 to 7.

Particular importance within the scope of the invention is to be attributed to the binder mixture comprising alcohol-soluble and solvent-resistant binders, the latter being especially binders which are sparingly soluble in alcohol. The binder must not only anchor the pigments to the surface of the receptor sheet but must at the same time be sufficiently solvent-resistant of ensure trouble-free moistening with alcoholic liquid and subsequent transfer printing. In addition, the binder is one of the components which are critical for the absorption behavior of the surface of the receptor sheet. This absorption behavior influences the amount of dye detached and dissolved during the printing process which in turn is determined by the two actually contrary requirements of the sufficiently clear and defined image and the greatest possible number of copies from a preformed dey-carrying base.

The absorption behavior of the reactive pigment coating is additionally influenced by the absorptive capacity and absorption power of the pigments contained in the reactive coating. In connection herewith, it is proposed according to the invention to use also a pigment mixture in connection with mixture of binders. A mixture of highly absorbent and sparingly absorbent pigments is used. Thus, in the preferred embodiment of the invention, four essential constituents of the reactive pigments are to be used, i.e. the two types of binders and the two types of pigments. These four components are conveniently used in such relative proportions that the reactive pigment coating has an absorption behavior which can be determined numerically. This behavior is to be determined by a test which was developed for the purposes of the invention. This absorption behavior is hereinafter referred to as "alcohol resistance (AR)" and is determined as follows:

DETERMINATION OF ALCOHOL RESISTANCE BY THE ALCOHOL DROP TEST:

The test procedure is based on two factors:

(a) the absorption time of an alcohol drop, measured in seconds;

(b) the average drop diameter, measured in millimeters.

An alcohol-impervious substrate, a ground glass plate, is used as the standard.

CONDITIONING FOR TESTING (ACCORDING TO DIN 50 014):

20° C., 65% relative humidity.

PROCEDURE:

The test specimen is placed horizontally on an alcohol-impervious support. Then a drop of alcohol (98%) is placed on the test surface from a microburette which is arranged vertically above the test specimen at a distance of 20 mm. As soon as the drop impinges on the test surface, a stop watch is set going.

Depending upon the alcohol resistance of the test specimen, the drop penetrates into the material after a time $T_p$ (seconds) to be measured thereby forming a spot which is circular in most cases and which is determined as average drop diameter $D_p$ (mm.), measured diagonally. The drop test is repeated at three points of the test surface. The arithmetic mean is calculated from the test results $T_p$ and $D_p$, respectively. These results are substituted in a formula to be described later.

The absorption time and drop diameter on a ground glass plate are determined as the reference standard for a 100% alcohol resistance. The incapability of the alcohol drop to penetrate into the glass results in a relatively large drop diameter. The absorption time in this case corresponds to the time of evaporation.

The values determined in series tests were fixed as glass standard values about as follows:

| | | |
|---|---|---|
| | absorption time | $T_S = 80$ seconds |
| Glass standard values | average drop diameter | $D_S = 25$ mm. |

CALCULATION:

The alcohol resistance of the test specimen, based on the glass standard, is expressed in percent and determined by means of the following formula:

$$AR = \frac{T_p \cdot D_p}{T_S \cdot D_S} \times 100\,(\%)$$

$$AR = \frac{T_p \cdot D_p}{80 \cdot 25} \times 100 = \frac{T_p \cdot D_p}{2} \times 10^{-1}\,(\%)$$

$AR$ = alcohol resistance (%)
$T_p$ = absorption time — test specimen (seconds)
$T_S$ = absorption time — glass standard (sec.) = 80 seconds
$D_p$ = average drop diameter — test specimen (mm.)
$D_S$ = average drop diameter — glass standard (mm.) = 25 mm.

ACCURACY:

The tests have shown that the maximum deviations for the same product are ±5% determined by one or several persons.

It is preferred in accordance with the invention to conform the pigment and binder components of the reactive pigment coating to one another in such a manner that the alcohol resistance (AR) of the coated base sheets as determined by the alcohol drop test is 50 to 70% of the reference value on the glass plate.

It has been found to be desirable to this end to use from 20 to 50% of the alcohol-soluble binder and from 50 to 80% of the alcohol-resistant binder in the mixture of binders. It is convenient to use from 30 to 80% of the highly absorbent pigment per 70 to 20% of the sparingly absorbent pigment in the mixture of pigments. Highly absorbent pigments having an absorption coefficient, determined according to ASTM 281-31, of 100 to 160 g./100 g. and preferably from 110 to 130 g./100 g. are preferably used as the highly absorbent pigment. As the sparingly absorbent pigments those having an absorption coefficient of 40 to 60 g./100 g. and preferably of 45 to 50 g./100 g. as determined by the same test are preferred.

The specific pigments used are those types of pigments which are usual in paper manufacture. Especially clay types having high to medium absorptive power are suitable as highly absorptive pigments. A particularly useful material is Attapulgus clay, i.e. a natural pigment in powder form activated by thermal treatment and having high absorptive power. An example of a suitable material is one having an average particle size of about 3 microns and a pH of about 7.5. Another suitable material is Silton clay of Japanese origin. As pigments of low absorptive power, pigments used in paper industry and having smoothing action are particularly preferred. A typical example is naturally occurring kaolin. An example of a suitable material is one of German origin having an average particle size of about 0.5 microns and a pH of about 6.3.

In general, all of the components of the coating composition are selected such that the finished reactive pigment coating has the neutral to weakly acidic condition desired. In this connection, the selection of the appropriate types of binders may be particularly important. Synthetic binders, especially those based on acrylate-containing copolymers are preferred. In paper manufacture, various types of acrylate copolymers are being offered and used especially as pigment binders. Their sensitivity to solvents can again be determined by a very simple hand test. If a sample of the particular plastics dispersion is placed on absorbent paper, the liquid phase is immediately absorbed completely by the paper leaving a coating of the pure binder on the surface of the paper. This coating is now moistened with an alcohol drop. Immediately thereafter the spot which is moist with alcohol is carefully rubbed with the finger tip. Binders which are highly soluble in alcohols dwindle immediately on careful rubbing so that the original paper structure is rapidly sensed. On the other hand, the alcohol-resistant types of binders are largely resistant in this finger tip test. It is at best possible after rubbing for a long period of time to remove the binder coating to an extent sufficient that the paper structure can be sensed again. Suitable binders can be readily selected by means of this simple hand test. Weakly acidic and at best very weakly basic polyacrylate copolymer dispersions are the preferred binder types for preparing the reactive pigment coating.

The further usual constituents of such a pigment coating composition, i.e., for example, the dispersants, antifoaming agents and dyes are also selected in such a manner that the pH range desired of the finished coating is ensured. It is to be considered especially when selecting the dyes that these are alcohol-proof and stable to elevated temperatures. Dyes which are heat resistant up to about 160° C. are preferably used.

The reactive pigment coating is desirably present on the support sheet in amounts of 3 to 12 g./sq.m. Preferred are amounts of 5 to 10 g./sq.m. Suitable base sheets in addition to paper, paper board or carton include any other sheet material such as metal or plastic film.

To obtain a clear and sharp printed image in the transfer printing method, adequate smoothness values are necessary in the surface of the coated receptor sheet. It is possible with the coating compositions according to the invention to obtain smoothness values of at least Gl(Bekk) = 200 s and preferably Gl (Bekk) = 300 to 1000 s or more by conventional glazing.

EXAMPLE

In 350 parts of cold water are dissolved 1.2 parts of a dispersing agent (polycarboxylic acid salts) and 0.5 parts of a commercially available antifoaming agent for coating compositions. While vigorously stirring, 50 parts of Attapulgus clay (yellowish white pigment is powder form having an average particle size of 2.9 microns; pH 7.5) and 50 parts of kaolin (ultrafine particles, pH 6.3) are added.

Upon completed dispersion of the clay and kaolin, 11 parts, of a binder I and 19 parts of a binder II are admixed. The binder I is an aqueous anionic plastics dispersion of an acrylate-containing copolymer (readily alcohol-soluble) having a pH of 3.5 to 4.7. The binder II is an aqueous anionic plastics dispersion of an acrylate-containing copolymer (largely alcohol-resistant) having a pH of 7.5 to 8.5.

Thereafter the shade desired is adjusted by adding pigment dyes. Then the composition is made up to about 500 parts with water. A pH within the weakly acidic region is obtained.

This coating composition is applied to paper by means of an air-knife coater and then dried at 80° to 160° C. The coating weight ranges between 6 and 10 g./sq.m. In a subsequent process step, the coated material is glazed on a calender stack. This is followed by cutting to size, sorting and packaging.

The receptive paper sheets prepared in this manner are outstandingly suited for use in a transfer printing method with basic reactive dyes.

What is claimed is:

1. A base sheet formed of material selected from the group consisting of paper, metal and plastic, suitable for use as a receptor sheet in a printing process employing a carrying sheet containing an alcoholic solution of a basic reactive dye, said base sheet being provided on at least one of its surfaces with a reactive pigment coating having a pH value of about 5 to 8 and, an alcohol resistance as determined by the alcohol drop test which is 50 to 70% of the reference value on a glass plate comprising an intimate mixture of (a) two absorbent pigments of different absorption values, one pigment being highly absorbent and having an absorption coefficient, determined according to ASTM 281-31 of about 100 to 160 g./100 g., the other pigment being sparingly absorbent and having an absorption coefficient determined according to said ASTM 281-31 of about 40 to 60 g./100 g., said pigments being present in amounts of from about 30 to 80% of said highly absorbent pigment to about 70 to 20% of said sparingly absorbent pigment: and (b) two binders of different solubilities, one binder being solvent-resistant and the other binder being alcohol-soluble, said binders being present in amounts of from about 50 to 80% of said solvent-resistant binder to about 50 to 20% of said alcohol-soluble binder.

2. A base sheet according to claim 1 wherein said highly absorbent pigment and said sparingly absorbent pigment have an absorption coefficient, respectively, determined accordingly to ASTM 281-31, of about 110 g. to 130 g./100 g. and of about 45 to 50 g./100 g.

3. A base sheet according to claim 1 wherein said reactive coating is in amount of about 5 to 10 g./sq.m.

4. A base sheet according to claim 1 wherein said reactive coating when reacted with said basic reactive dye produces a colored reaction product dye which is fast to solvents and heat resistant up to about 160° C.

5. A base sheet according to claim 1 wherein said pH value is about 6 to 7.

6. A base sheet according to claim 1 wherein said binders are acrylate-containing copolymers.

7. A base sheet according to claim 1 wherein said highly absorbent pigment is of the clay type.

8. A base sheet according to claim 1 wherein said reactive coating is in amount of about 3 to 12 g./sq.m.

9. A base sheet according to claim 1, said solvent resistant binder being a synthetic binder.

10. A base sheet according to claim 1, said highly absorbent pigment having an average particle size of 3 microns, said sparingly absorbent pigment having an average particle size of 0.5 microns.

* * * * *

UNITED STATES PATENT AND TRADEMARK OFFICE

CERTIFICATE OF CORRECTION

PATENT NO. : 4,142,738

DATED : March 6, 1979

INVENTOR(S) : Wilfried Steinbach

It is certified that error appears in the above-identified patent and that said Letters Patent are hereby corrected as shown below:

Title page, [73], the name of the assignee is incomplete.

The complete name is:

C. F. Wachendorff GmbH & Co., KG

Signed and Sealed this

*Thirteenth* Day of *May 1980*

[SEAL]

*Attest:*

SIDNEY A. DIAMOND

*Attesting Officer* *Commissioner of Patents and Trademarks*